United States Patent
Mehta et al.

(10) Patent No.: US 11,689,264 B2
(45) Date of Patent: Jun. 27, 2023

(54) DETERMINING A NARROW BEAM FOR WIRELESS COMMUNICATION

(71) Applicant: QUALCOMM Incorporated, San Diego, CA (US)

(72) Inventors: Ravi Shankar Mehta, Ranchi (IN); Girish Kakalwar, Kalaburgi (IN); Dheeraj Sai V L Naga Dhulipalla, Nellore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 367 days.

(21) Appl. No.: 16/947,531

(22) Filed: Aug. 5, 2020

(65) Prior Publication Data
US 2022/0045727 A1    Feb. 10, 2022

(51) Int. Cl.
*H04B 7/06*    (2006.01)
*H04B 17/391*    (2015.01)
(Continued)

(52) U.S. Cl.
CPC .......... *H04B 7/0617* (2013.01); *G06N 3/02* (2013.01); *H04B 17/391* (2015.01); *H04W 40/20* (2013.01); *H04W 52/04* (2013.01)

(58) Field of Classification Search
CPC .... H04B 7/0617; H04B 17/391; H04B 7/022; H04B 7/024; H04B 7/026; H04B 7/04;
(Continued)

(56) References Cited

U.S. PATENT DOCUMENTS 7,764,231 B1 *    7/2010    Karr ..................... H04W 4/025
                                                              342/453
9,369,845 B2 *    6/2016    Alizadeh-Shabdiz ......................
                                                              H04W 4/025
(Continued)

FOREIGN PATENT DOCUMENTS

EP    3664310 A1 *    6/2020    ............. G01S 19/01

OTHER PUBLICATIONS

Ali, Anum, et al. "Leveraging sensing at the infrastructure for mmWave communication." IEEE Communications Magazine 58.7 (2020): 84-89 (Year: 2020).*

(Continued)

*Primary Examiner* — Sharad Rampuria
(74) *Attorney, Agent, or Firm* — Harrity & Harrity, LLP

(57) ABSTRACT

Various aspects of the present disclosure generally relate to wireless communication. In some aspects, a first wireless communication device may determine, based at least in part on a first model, an estimated position of the first wireless communication device. The first wireless communication device may determine, based at least in part on a second model, an estimated direction for transmission of a packet to a second wireless communication device. The first wireless communication device may determine, based at least in part on a third model, an estimated transmit power for transmission of the packet. The first wireless communication device may determine, using a neural network, a narrow beam based at least in part on the estimated position, the estimated direction, and the estimated transmit power. The first wireless communication device may transmit the packet on the narrow beam to the second wireless communication device. Numerous other aspects are provided.

30 Claims, 11 Drawing Sheets

(51) Int. Cl.
  *G06N 3/02*    (2006.01)
  *H04W 40/20*   (2009.01)
  *H04W 52/04*   (2009.01)

(58) Field of Classification Search
  CPC .... H04B 7/0413; H04B 7/15592; G06N 3/02; G06N 3/0454; G06N 3/084; H04W 40/20; H04W 52/04; H04W 52/283; G01S 5/0009; G01S 5/0244; G01S 5/0278; G01S 5/0284; G01S 19/51; G01S 13/878
  See application file for complete search history.

(56) References Cited

U.S. PATENT DOCUMENTS

| | | | | |
|---|---|---|---|---|
| 10,285,015 | B2* | 5/2019 | Shirakata | H04L 67/52 |
| 10,517,061 | B1* | 12/2019 | Kumar | H04W 24/08 |
| 10,812,125 | B1* | 10/2020 | Badic | H04B 7/0408 |
| 2013/0285855 | A1* | 10/2013 | Dupray | H04W 4/029 |
| | | | | 342/451 |

OTHER PUBLICATIONS

Dhillon, Santpal Singh, and Krishnendu Chakrabarty. "Sensor placement for effective coverage and surveillance in distributed sensor networks." 2003 IEEE Wireless Communications and Networking, 2003. WCNC 2003.. vol. 3. IEEE, 2003. (Year: 2003).*

* cited by examiner

DETERMINING A NARROW BEAM FOR WIRELESS COMMUNICATION

FIELD OF THE DISCLOSURE

Aspects of the present disclosure generally relate to wireless communication and to techniques and apparatuses for determining a narrow beam for wireless communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device includes determining, based at least in part on a first model, an estimated position of the first wireless communication device; determining, based at least in part on a second model, an estimated direction for transmission of a packet to a second wireless communication device; determining, based at least in part on a third model, an estimated transmit power for transmission of the packet to the second wireless communication device; determining, using a neural network, a narrow beam based at least in part on the estimated position, the estimated direction, and the estimated transmit power; and transmitting the packet on the narrow beam to the second wireless communication device.

In some aspects, a first wireless communication device for wireless communication includes a memory; and one or more processors operatively coupled to the memory, the memory and the one or more processors configured to determine, based at least in part on a first model, an estimated position of the first wireless communication device; determine, based at least in part on a second model, an estimated direction for transmission of a packet to a second wireless communication device; determine, based at least in part on a third model, an estimated transmit power for transmission of the packet to the second wireless communication device; determine, using a neural network, a narrow beam based at least in part on the estimated position, the estimated direction, and the estimated transmit power; and transmit the packet on the narrow beam to the second wireless communication device.

In some aspects, a non-transitory computer-readable medium storing a set of instructions for wireless communication includes: one or more instructions that, when executed by one or more processors of a first wireless communication device, cause the first wireless communication device to determine, based at least in part on a first model, an estimated position of the first wireless communication device; determine, based at least in part on a second model, an estimated direction for transmission of a packet to a second wireless communication device; determine, based at least in part on a third model, an estimated transmit power for transmission of the packet to the second wireless communication device; determine, using a neural network, a narrow beam based at least in part on the estimated position, the estimated direction, and the estimated transmit power; and transmit the packet on the narrow beam to the second wireless communication device.

In some aspects, a first apparatus for wireless communication includes means for determining, based at least in part on a first model, an estimated position of the first apparatus; means for determining, based at least in part on a second model, an estimated direction for transmission of a packet to a second apparatus; means for determining, based at least in part on a third model, an estimated transmit power for transmission of the packet to the second apparatus; means for determining, using a neural network, a narrow beam based at least in part on the estimated position, the estimated direction, and the estimated transmit power; and means for transmitting the packet on the narrow beam to the second apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
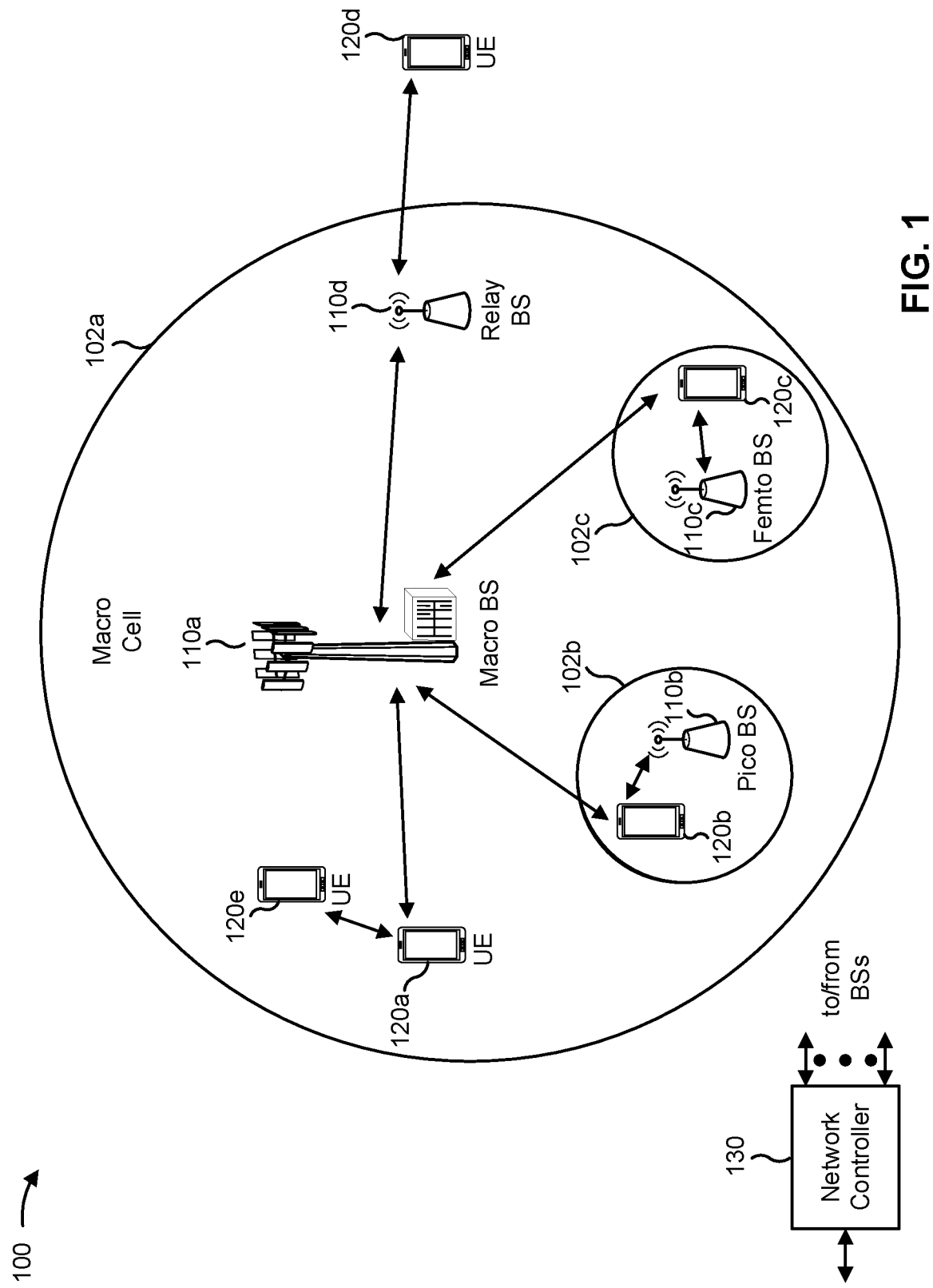
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "g B", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
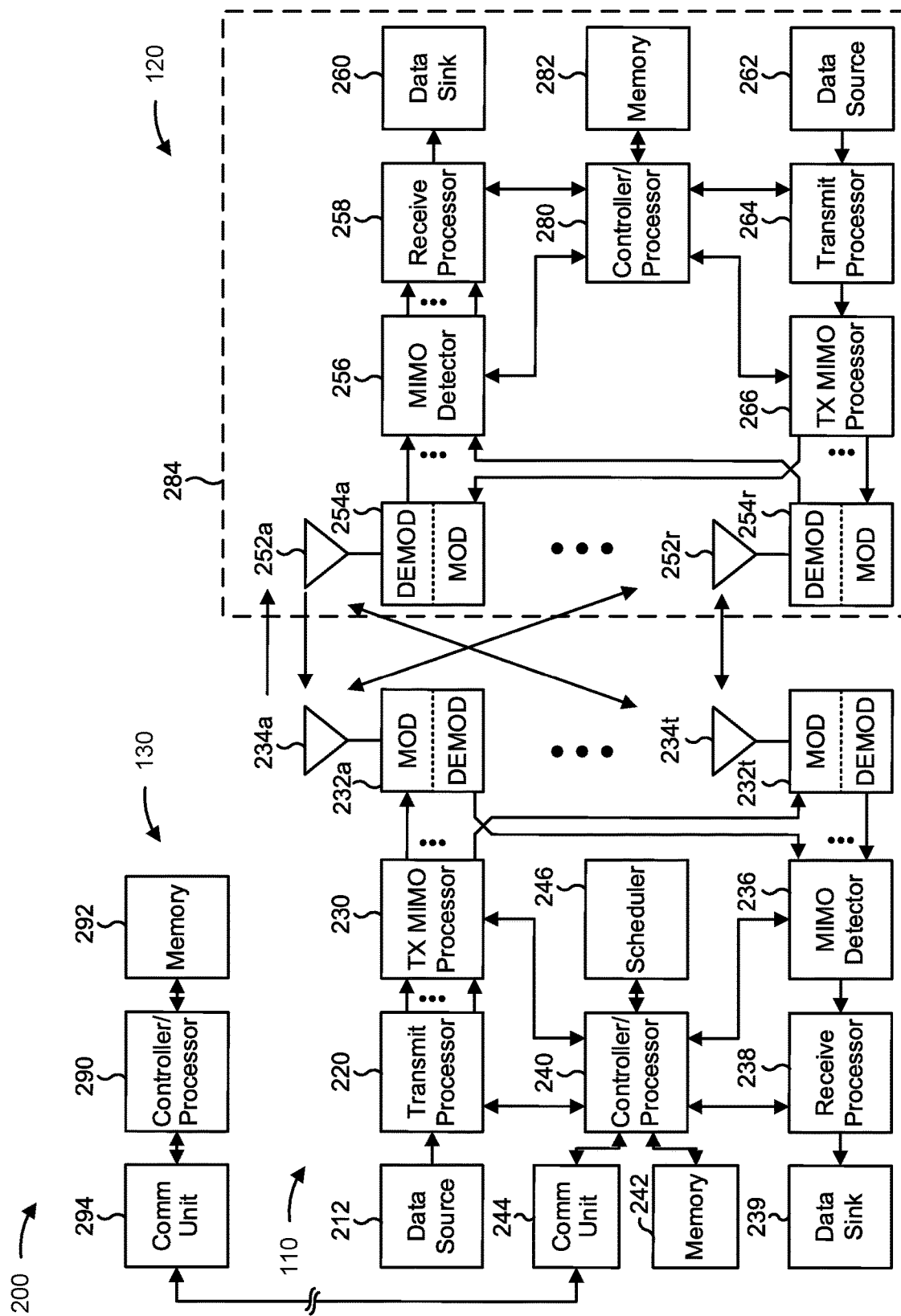
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4A-4G and 5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4A-4G and 5.

Controller/processor 240 of base station 110, controller/processor 280 of UE 120, and/or any other component(s) of FIG. 2 may perform one or more techniques associated with determining a narrow beam for wireless communication, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5 and/or other processes as described herein. In some aspects, executing instructions may include running the instructions, converting the instructions, compiling the instructions, interpreting the instructions, and/or the like.

In some aspects, a first wireless communication device (e.g., a UE 120 or a BS 110) may include means for determining, based at least in part on a first model, an estimated position of the first wireless communication device, means for determining, based at least in part on a second model, an estimated direction for transmission of a packet to a second wireless communication device (e.g., a UE 120 or a BS 110), means for determining, based at least in part on a third model, an estimated transmit power for transmission of the packet to the second wireless communication device, means for determining, using a neural network, a narrow beam based at least in part on the estimated position, the estimated direction, and the estimated transmit power, means for transmitting the packet on the narrow beam to the second wireless communication device, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
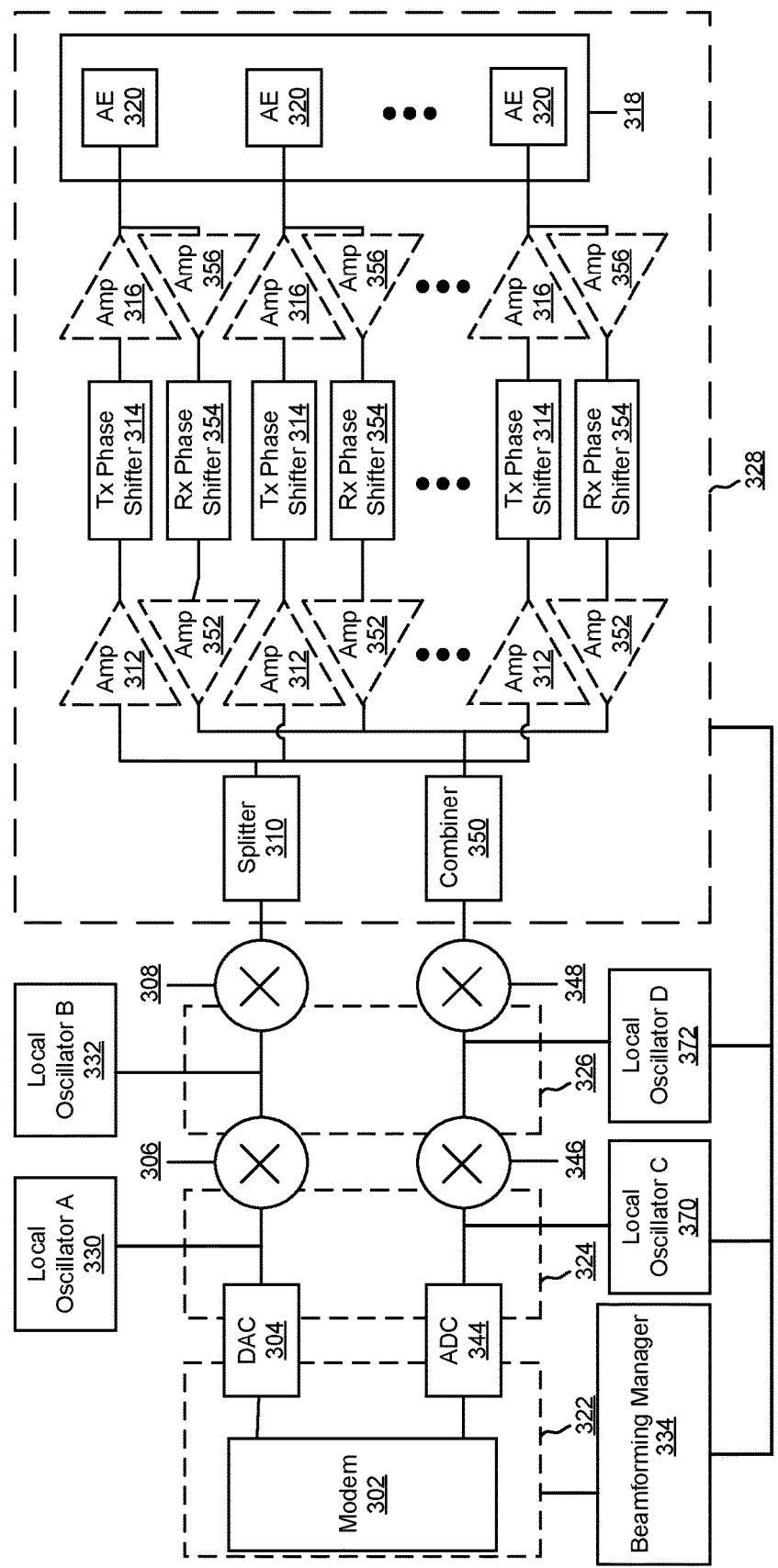
FIG. 3 is a diagram illustrating an example beamforming architecture 300 that supports beamforming for millimeter wave (mmWave) communications, in accordance with various aspects of the present disclosure.

FIG. 3 is a diagram illustrating an example beamforming architecture 300 that supports beamforming for millimeter wave (mmW) communications, in accordance with various aspects of the present disclosure. In some aspects, the beamforming architecture 300 may implement aspects of wireless network 100. In some aspects, the beamforming architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The beamforming architecture 300 includes a modem (modulator/demodulator) 302, a digital to analog converter (DAC) 304, a first mixer 306, a second mixer 308, and a splitter 310. The beamforming architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the beamforming architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a beamforming manager 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the beamforming manager 334 may adjust the frequency of local oscillator A 330 and/or the local oscillator B 332 so that a desired IF and/or RF frequency is produced and used to facilitate processing and transmission of a signal within a desired bandwidth.

In the beamforming architecture 300, signals upconverted by the second mixer 308 are split or duplicated into multiple signals by the splitter 310. The splitter 310 in the beamforming architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the beamforming manager 334) to provide independent control of the gain for each antenna element 320. For example, the modem 302 and/or the beamforming manager 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the beamforming manager 334 may have at least one control line connected to each of the phase shifters 314 and which may be used to configure the phase shifters 314 to provide a desired amount of phase shift or phase offset between antenna elements 320.

In the beamforming architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the beamforming manager 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the beamforming architecture 300, signals output by the phase shifters 354 (via the amplifiers 352 when present) are combined in combiner 350. The combiner 350 in the beamforming architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The beamforming architecture 300 is given by way of example only to illustrate an architecture for transmitting and/or receiving signals. In some cases, the beamforming architecture 300 and/or each portion of the beamforming architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the beamforming manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. In this way, the modem 304 and/or the beamforming manager 334 may be capable of generating, forming, and/or identifying a beam for transmission of a communication or a packet to another wireless communication. The beam may be a wide beam or a narrow beam (e.g., a beam that is relatively narrower compared to a wide beam and is more directional compared to a wide beam). The beamforming manager 334 may be located partially or fully within one or more other components of the beamforming architecture 300. For example, the beamforming manager 334 may be located within the modem 302 in some aspects.

As indicated above, FIG. 3 is provided as an example. Other examples may differ from what is described with regard to FIG. 3.

A 5G NR wireless network may provide higher data rates (e.g., 10-100 gigabits per second (Gbps) or greater) and lower end-to-end latencies (e.g., down to 1 millisecond or less) compared to previous generation wireless networks (e.g., LTE, 3G, and/or the like). Millimeter wave (mmWave) communication in high frequency bands (such as in the range of 30-300 GHz) may be used to obtain such data rates and latencies. However, transmissions in such high frequency bands may consume large amounts of power of a wireless communication device (e.g., a UE, a BS, and/or the like). As a result, the transmit power of a wireless communication device may be limited when performing mmWave communication in these high frequency bands.

Some aspects described herein provide techniques and apparatuses for determining a narrow beam for wireless communication, such as mmWave communication in a high frequency band. In some aspects, a first wireless communication device is capable of reducing transmit power by determining, generating, and/or configuring a narrow beam that may be used to transmit communications to a second wireless communication device. The use of the narrow beam at mmWave frequencies may provide more efficient use of the transmit power of the first wireless communication device relative to a wide beam, may provide a stronger transmission signal at mmWave frequencies relative to a wide beam, and/or the like.

In some aspects, the first wireless communication device may use various models and a neural network to determine, generate, and/or configure a narrow beam (e.g., the best narrow beam, an optimal narrow beam, and/or the like) to enable efficient communication with the second wireless communication device. The models and the neural network may account for movement of the first wireless communication device and the second wireless communication device, orientation of the first wireless communication device, transmit power of the first wireless communication device, and/or the like. Accordingly, the use of the models and the neural network enable the first wireless communication device to determine, generate, and/or configure a narrow beam that reduces power consumption of the first wireless communication device, that increases the signal strength of communications transmitted on the narrow beam, increases reliability of communications transmitted on the narrow beam, decreases latency for the communications transmitted on the narrow beam, and/or the like.

Figure 4A:
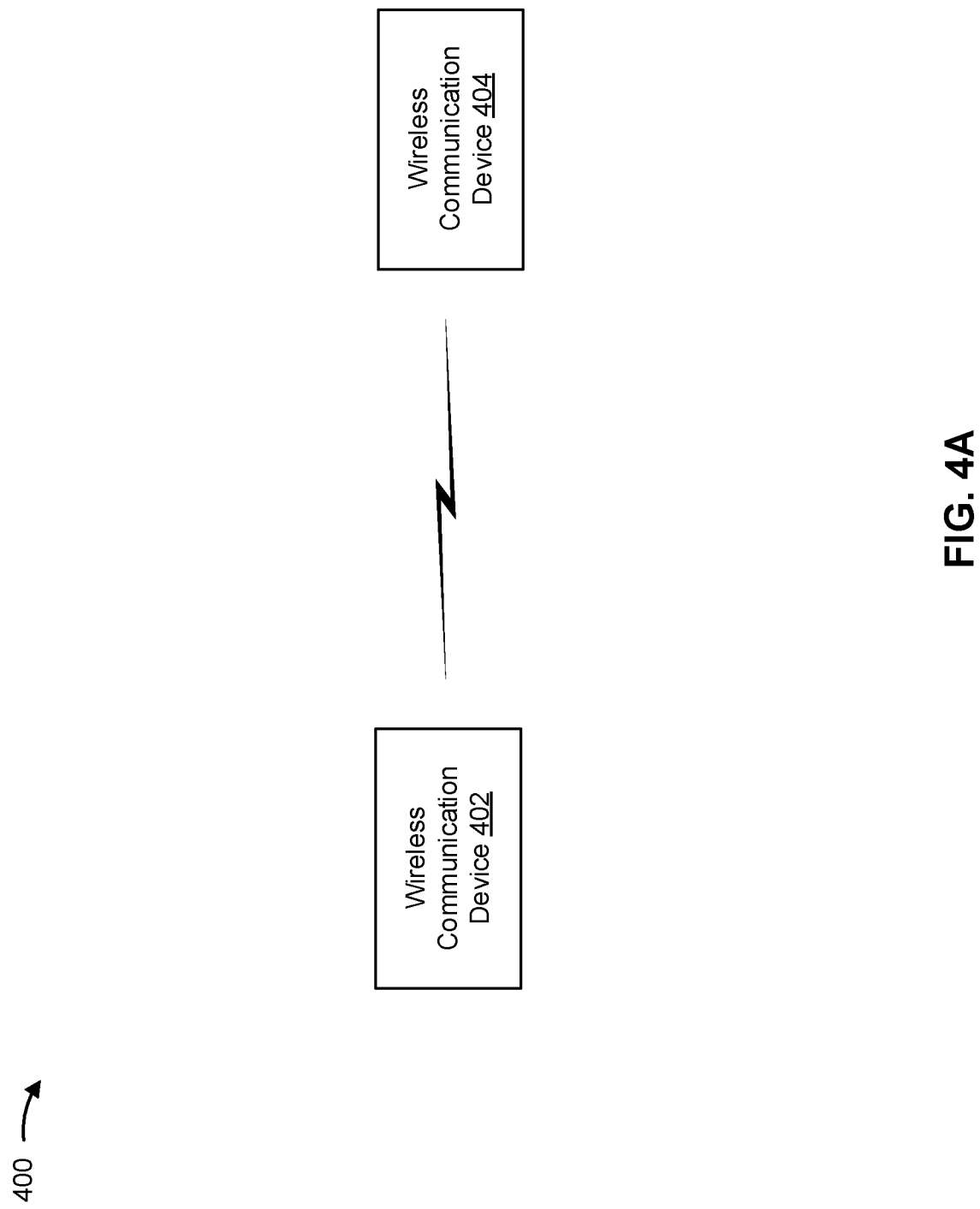
FIGS. 4A-4G are diagrams illustrating examples associated with determining a narrow beam for wireless communication, in accordance with various aspects of the present disclosure.

FIGS. 4A-4G are diagrams illustrating one or more examples 400 associated with determining a narrow beam for wireless communication, in accordance with various aspects of the present disclosure. As shown in FIG. 4A, example(s) 400 include wireless communication between a wireless communication device 402 and a wireless communication device 404. The wireless communication device 402 and the wireless communication device 404 may be included in a wireless network, such as wireless network 100 illustrated and described above in connection with FIG. 1.

In some aspects, the wireless communication device 402 includes a UE 120, a BS 110, or another type of wireless communication device. In some aspects, the wireless communication device 404 includes a UE 120, a BS 110, or another type of wireless communication device. In some aspects, the wireless communication device 402 and the wireless communication device 404 communicate on a wireless access link, which may include an uplink and a downlink. In some aspects, the wireless communication device 402 and the wireless communication device 404 communicate on a wireless sidelink.

The communication device 402 and the communication device 404 may be capable of communicating on a high frequency band, such as an mmWave frequency band, an FR2 frequency band, and/or the like. Accordingly, the wireless communication device 402 and the wireless communication device 404 may be capable of performing beamforming for communications transmitted between the wireless communication device 402 and the wireless communication device 404. In these examples, the wireless communication device 402 and the wireless communication device 404 may each include a beamforming architecture, such as the beamforming architecture 300 illustrated and described above in connection with FIG. 3.

Figure 4B:
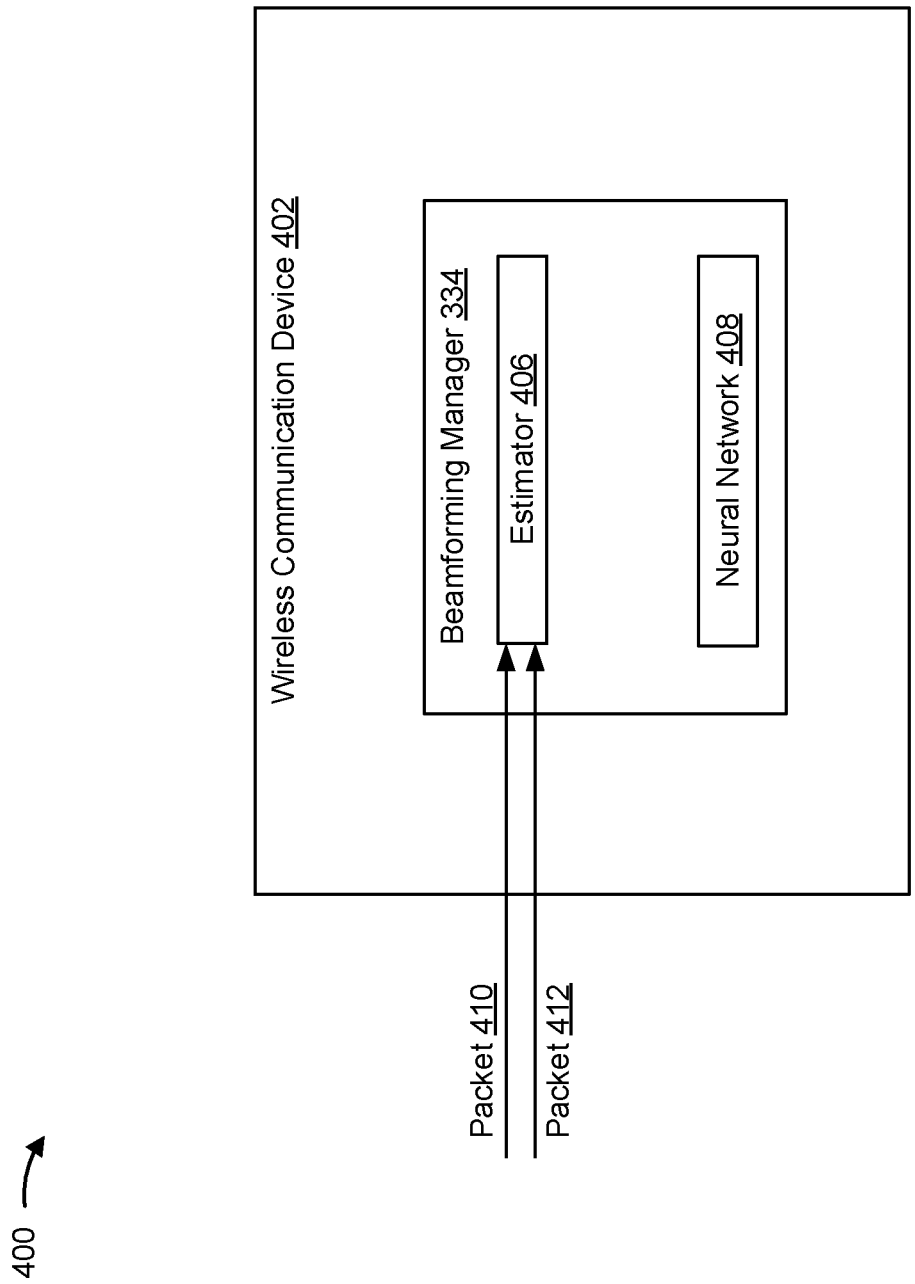

As shown in FIG. 4B, the beamforming manager 334 (and/or the modem 302, the transmit processor 220, the receive processor 230, the controller/processor 240, the receive processor 258, the transmit processor 264, the controller/processor 280, and/or the like) may include an estimator 406 and a neural network 408. The estimator 406 may include one or more devices, circuits, processors, and/or the like capable of performing various actions associated with beamforming, such as receiving various inputs, generating various parameters based at least in part on the inputs, and providing the parameters to the neural network 408. The neural network 408 may include one or more devices, circuits, processors, and/or the like capable of performing various actions associated with beamforming, such as receiving the parameters from the estimator 406 and determining, generating, and/or configuring a narrow beam for use in communication with the wireless communication device 404.

As further shown in FIG. 4B, the estimator 406 may receive (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) a packet 410 and a packet 412. The packet 410 may be a packet that was received from the wireless communication device 404. The packet 412 may be a packet that is received from a data source (e.g., data source 212, data source 262, and/or the like) of the wireless communication device 402, and is to be transmitted as a communication to the wireless communication device 404.

Figure 4C:
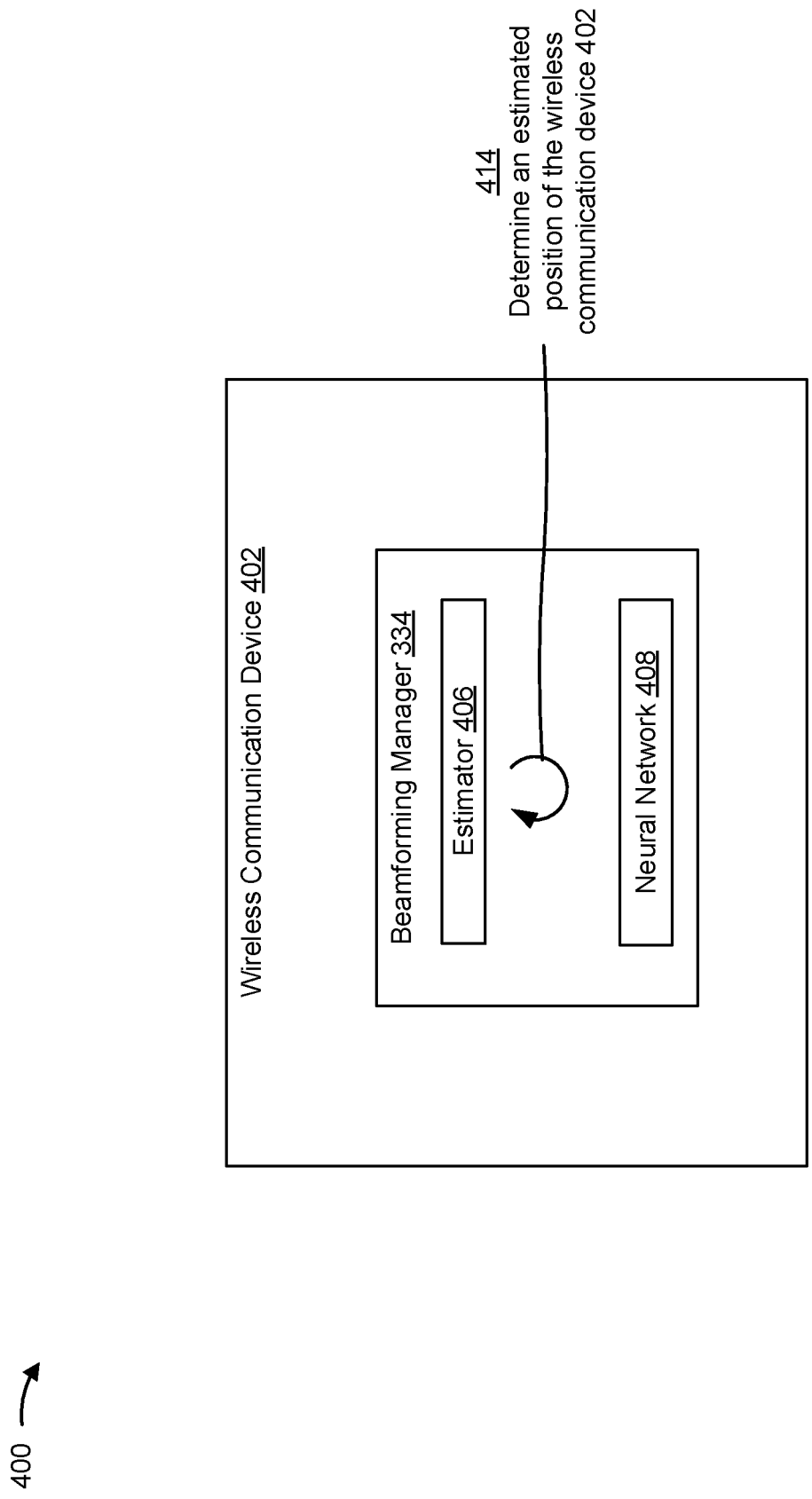

As shown in FIG. 4C, and by reference number 414, the estimator 406 (e.g., using transmit processor 220, receive processor 238, controller/processor 240, memory 242, receive processor 258, transmit processor 264, controller/processor 280, memory 282, and/or the like) may determine an estimated position of the wireless communication device 402. The estimator 406 may determine the estimated position of the wireless communication device 402 so that movement and/or mobility of the wireless communication device 402 is taken into account when the neural network 408 determines, generates, and/or configures the narrow beam for transmission of the packet 412 to the wireless communication device 404.

In some aspects, the estimator 406 may determine the estimated position of the wireless communication device 402 based at least in part on the packet 410 and the packet 412. For example, the estimator 406 may determine the estimated position of the wireless communication device 402 based at least in part on one or more parameters associated with the packet 410 and one or more parameters associated with the packet 412. In some aspects, the one or more parameters for the packet 410 may be indicated in and/or by the packet 410. In some aspects, the wireless communication device may determine (e.g., using transmit processor 220, receive processor 238, controller/processor 240, memory 242, receive processor 258, transmit processor 264, controller/processor 280, memory 282, and/or the like) the one or more parameters for the packet 410 based at least in part on reception of the packet 410. In some aspects, the wireless communication device 402 may determine (e.g., using transmit processor 220, receive processor 238, controller/processor 240, memory 242, receive processor 258, transmit processor 264, controller/processor 280, memory 282, and/or the like) the one or more parameters for the packet 412.

The one or more parameters for the packet 410 may include beam position coordinates associated with the wireless communication device 404 (e.g., x, y, and z coordinates), global navigation satellite system (GNSS) coordinates (or global positioning (GPS) coordinates, or another type of satellite positioning system coordinates) associated with the wireless communication device 404 (e.g., gx, gy, and gz coordinates), and/or the like. In some aspects, the beam position coordinates and the GNSS coordinates may be determined by the wireless communication device 404 at the time that the packet 410 was transmitted. The one or more parameters for the packet 412 may include beam position coordinates associated with the wireless communication device 402 (e.g., x, y, and z coordinates), GNSS coordinates (or GPS coordinates, or another type of satellite positioning system coordinates) associated with the wireless communication device 402 (e.g., $g_x$, $g_y$, and $g_z$ coordinates), and/or the like.

In some aspects, the estimator 406 may determine the estimated position of the wireless communication device 402 by using the one or more parameters for the packet 410 and the one or more parameters for the packet 412 in a first model. In this way, the estimator 406 may use the beam position coordinates and the GNSS coordinates of the wireless communication device 402 and the wireless communication device 404 to model the movement of the wireless communication device 402 and the wireless communication device 404 to determine the estimated position of the wireless communication device 402.

The first model may include a regression model. The estimator 406 may divide the three special dimensions (e.g., an x axis, a y axis, and a z axis) into two coordinate planes (e.g., an xy plane and a yz plane), and may process the one or more parameters for the packet 410 and the one or more parameters for the packet 412 in the first model for each of the two planes. The estimator 406 may divide each of the two coordinate planes into a plurality of parts and may determine respective sets of coordinate fields for each of the two coordinate planes. For example, the estimator 406 may divide the xy coordinate plane into a plurality of parts and determine a first set of coordinate fields for the xy coordinate plane based at least in part on the plurality of parts using the regression model, and may divide the yz coordinate plane into a plurality of parts and determine a second set of coordinate fields for the yz coordinate plane based at least in part on the plurality of parts using the regression model.

The first set of coordinate fields for the xy coordinate plane may include a first beam coordinate field ($\hat{x}$), a second beam coordinate field ($\hat{y}$), a first GNSS coordinate field ($g_x$), and a second GNSS coordinate field ($g_y$). The estimator 406 may determine (e.g., using transmit processor 220, receive processor 238, controller/processor 240, memory 242, receive processor 258, transmit processor 264, controller/processor 280, memory 282, and/or the like) the first beam coordinate field ($\hat{x}$) based at least in part on Equation 1:

$$\hat{x} = (\overline{beam_{x_i-1}} - x_i)^2 \quad \text{Equation 1}$$

where the first beam coordinate field ($\hat{x}$) is based at least in part on a difference between the first beam position coordinate for beam (i) (e.g., $x_i$) and an accumulated change for the first beam position coordinate (e.g., $\overline{beam_{x_i-1}}$).

The estimator 406 may determine (e.g., using transmit processor 220, receive processor 238, controller/processor 240, memory 242, receive processor 258, transmit processor 264, controller/processor 280, memory 282, and/or the like) the second beam coordinate field ($\hat{y}$) based at least in part on Equation 2:

$$\hat{y} = (\overline{beam_{y_i-1}} - y_i)^2 \quad \text{Equation 2}$$

where the second beam coordinate field ($\hat{y}$) is based at least in part on a difference between the second beam position coordinate for beam (i) (e.g., $y_i$) and an accumulated change for the second beam position coordinate (e.g., $\overline{beam_{y_i-1}}$).

The estimator 406 may determine (e.g., using transmit processor 220, receive processor 238, controller/processor 240, memory 242, receive processor 258, transmit processor 264, controller/processor 280, memory 282, and/or the like) an accumulated change for a beam position coordinate for beam (i) based at least in part on Equation 3:

$$\overline{beam_i} = \sqrt{\sum_{k=0}^{i}(beam_k)^2/i}$$ Equation 3

The estimator 406 may determine (e.g., using transmit processor 220, receive processor 238, controller/processor 240, memory 242, receive processor 258, transmit processor 264, controller/processor 280, memory 282, and/or the like) the first GNSS coordinate field ($g_{\hat{x}}$) based at least in part on Equation 4:

$$\hat{g_x} = (\overline{GNSS_{g_{x_{i-1}}}} - g_{x_i})^2$$ Equation 4 where the first GNSS coordinate field ($g_{\hat{x}}$) is based at least in part on a difference between the first GNSS coordinate for beam (i) (e.g., $g_{x_i}$) and an accumulated change for the first beam position coordinate $$(e.g., \overline{GNSS_{g_{x_{i-1}}}}).$$

The estimator 406 may determine (e.g., using transmit processor 220, receive processor 238, controller/processor 240, memory 242, receive processor 258, transmit processor 264, controller/processor 280, memory 282, and/or the like) the second GNSS coordinate field ($g_{\hat{y}}$) based at least in part on Equation 5:

$$\hat{g_y} = (\overline{GNSS_{g_{y_{i-1}}}} - g_{y_i})^2$$ Equation 5 where the first GNSS coordinate field ($g_{\hat{y}}$) is based at least in part on a difference between the first GNSS coordinate for beam (i) (e.g., $g_{y_i}$) and an accumulated change for the first beam position coordinate $$(e.g., \overline{GNSS_{g_{y_{i-1}}}}).$$

The estimator 406 may determine (e.g., using transmit processor 220, receive processor 238, controller/processor 240, memory 242, receive processor 258, transmit processor 264, controller/processor 280, memory 282, and/or the like) an accumulated change for a GNSS coordinate (i) based at least in part on Equation 6:

$$\overline{GNSS_i} = \sqrt{\sum_{k=0}^{i}(GNSS_k)^2/i}$$ Equation 6

The estimator 406 may further determine (e.g., using transmit processor 220, receive processor 238, controller/processor 240, memory 242, receive processor 258, transmit processor 264, controller/processor 280, memory 282, and/or the like) an estimated error for the first set of coordinate fields (e.g., for each coordinate field of the first set of coordinate fields). In some aspects, the estimator 406 determines the estimated error based at least in part on Equation 7:

$$error = \frac{\sqrt{\hat{x} + \hat{y} + \hat{g_x} + \hat{g_y}}}{4}$$ Equation 7

The estimator 406 may convert the error to be represented as a plurality of bits (e.g., 7 bits) such that the estimated error may be classified into one of a plurality (e.g., 127) of levels. The estimator 406 may further determine a confidence value for the estimated error, which may be represented by another bit.

The estimator 406 may determine (e.g., using transmit processor 220, receive processor 238, controller/processor 240, memory 242, receive processor 258, transmit processor 264, controller/processor 280, memory 282, and/or the like) the confidence value based at least in part on one or more error thresholds. For example, the estimator 406 may determine whether the estimated error satisfies a combined threshold (e.g., 5% error, 10% error, and/or the like) for all coordinate fields in the first set of coordinate fields. If the estimator 406 determines that the estimated error satisfies the combined threshold, the beamforming manager 334 may determine to use a wide beam or a parent beam to transmit the packet 412 to the wireless communication device 404.

If the estimator 406 determines that the estimated error does not satisfy the combined threshold, the estimator 406 may determine whether the error for each dimension in the coordinate plane (e.g., the xy coordinate plane) satisfies a coordinate plane threshold. For example, the estimator 406 may determine whether the estimated error for the x-axis of the xy coordinate plane satisfies an x-axis threshold, and may determine whether the error for the y-axis of the xy coordinate plane satisfies a y-axis threshold. If the estimator 406 determines that either of the x-axis threshold or the y-axis threshold is satisfied, the estimator 406 may determine the confidence value to be 0. If the estimator 406 determines that the x-axis threshold and the y-axis threshold are both not satisfied, the estimator may determine the confidence value to be 1.

The estimator 406 may determine the second set of coordinate fields for the yz coordinate plane in a similar manner as described above in connection with Equations 1-7. The second set of coordinate fields for the yz coordinate plane may include a first beam coordinate field (ŷ), a second beam coordinate field (ẑ), a first GNSS coordinate field ($g_{\hat{y}}$), and a second GNSS coordinate field ($g_{\hat{z}}$).

The output from the first model may include the estimated position of the wireless communication device 402. The estimated position of the wireless communication device 402 may be represented as a first antenna beam number for the first coordinate plane (e.g., the xy coordinate plane) that is based at least in part on the first set of coordinate fields, a second antenna beam number for the second coordinate plane (e.g., the yz coordinate plane) that is based at least in part on the second set of coordinate fields, the estimated error for the first set of coordinate fields, an estimated error for the second set of coordinate fields, a confidence value for the estimated error for the first set of coordinate fields, and a confidence value for the estimated error for the second set of coordinate fields. The outputs for each coordinate plane may include a first set of bits (e.g., 8 bits) for the antenna beam number, a second set of bits (e.g., 7 bits) for the estimated error, and a third set of bits (e.g., 1 bit) for the confidence value.

Figure 4D:
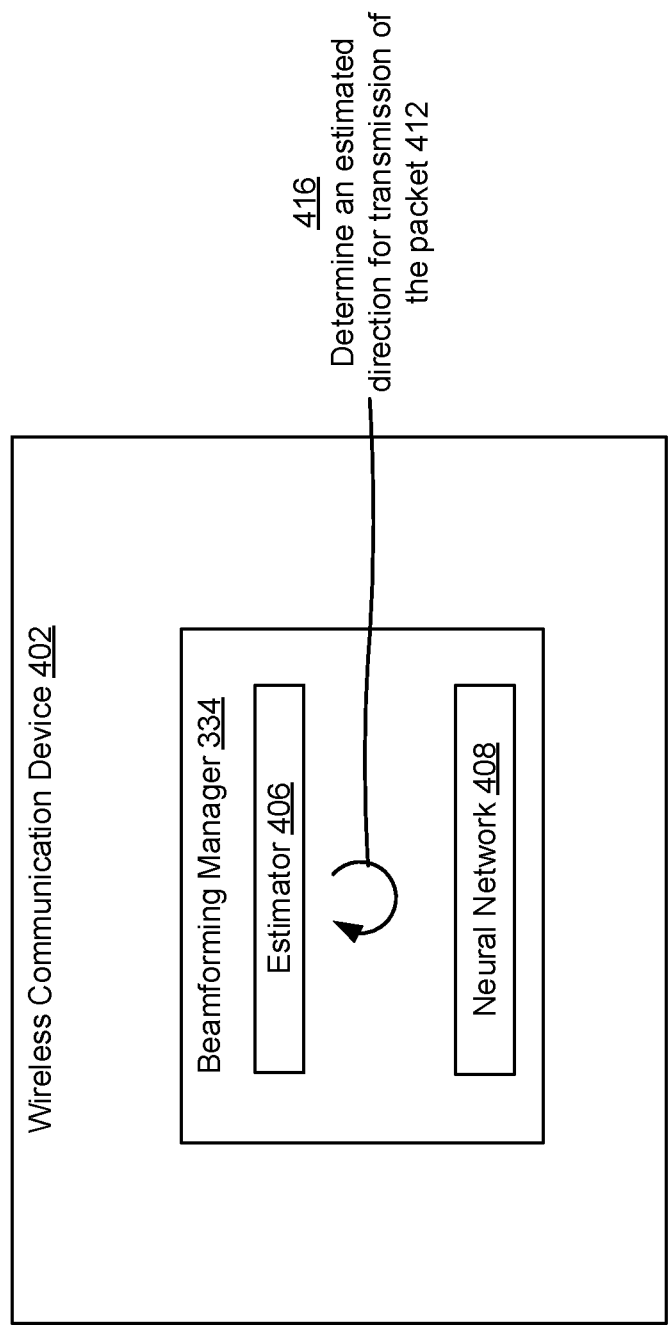

As shown in FIG. 4D, and by reference number 416, the estimator 406 may determine (e.g., using transmit processor 220, receive processor 238, controller/processor 240, memory 242, receive processor 258, transmit processor 264, controller/processor 280, memory 282, and/or the like) an estimated direction for the transmission of the packet 412 to wireless communication device 404. In some aspects, the estimator 406 may determine the estimated direction based at least in part on the output from the first model, such as the antenna beam numbers for the first coordinate plane and the second coordinate plane, the first set of coordinate fields for the first coordinate plane (e.g., the xy coordinate plane) and the second set of coordinate fields for the second coordinate plane (e.g., the yz coordinate plane), and/or the like.

The estimator 406 may determine the estimated direction using a second model. The second model may be a linear regression model or another type of model that is used to determine or generate a three-dimensional vector based at least in part on the antenna beam numbers, the first set of coordinate fields for the first coordinate plane (e.g., the xy coordinate plane), the second set of coordinate fields for the second coordinate plane (e.g., the yz coordinate plane), and/or the like. The estimator 406 may use the second model to generate a first two-dimensional vector for the first coordinate plane and a second two-dimensional vector for the second coordinate plane. Each two-dimensional vector may be represented as a weighting in each direction (e.g., northwest, northeast, southwest, south east, north, south, east, and west), and an estimated probability for each of the directions.

The estimator 406 may determine the three-dimensional vector from the first and the second two-dimensional vectors. For example, the estimator 406 may determine the three-dimensional vector based at least in part on the first and the second two-dimensional vectors. As another example, the estimator 406 may combine the first and the second two-dimensional vectors to generate the three-dimensional vector as output from the second model.

Figure 4E:
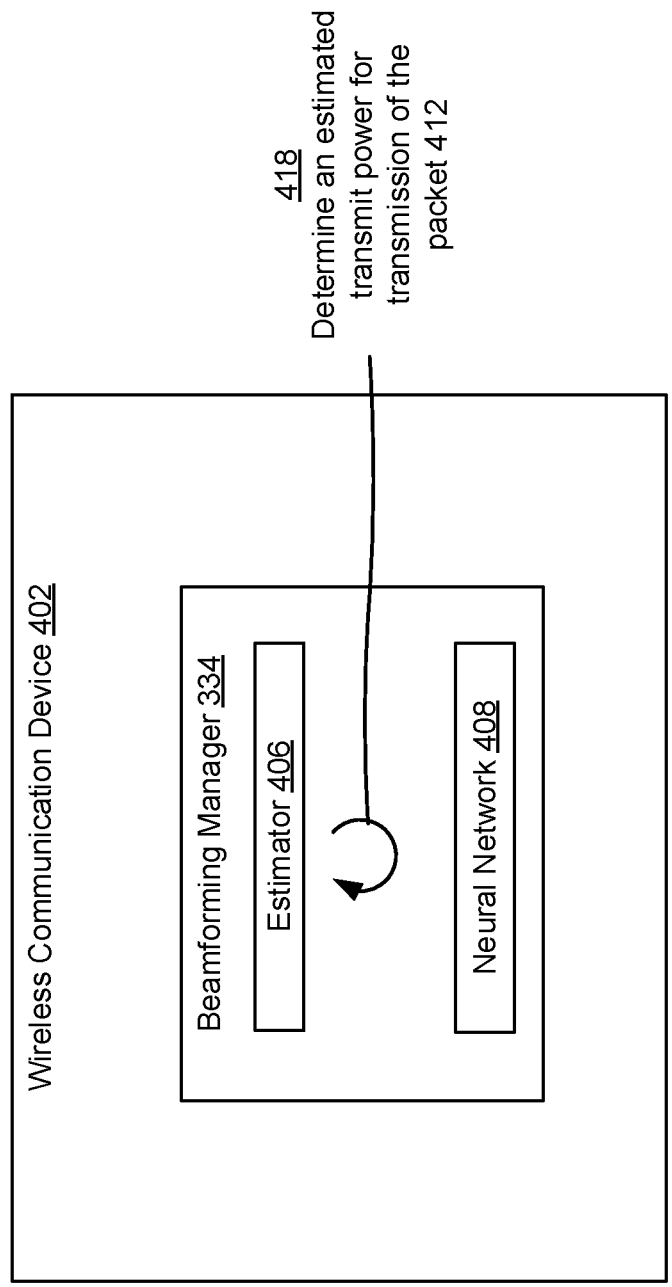

As shown in FIG. 4E, and by reference number 418, the estimator 406 may determine (e.g., using transmit processor 220, receive processor 238, controller/processor 240, memory 242, receive processor 258, transmit processor 264, controller/processor 280, memory 282, and/or the like) an estimated transmit power for the transmission of the packet 412 to wireless communication device 404. In some aspects, the estimator 406 may determine the estimated transmit power based at least in part on the output from the first model (e.g., the antenna beam numbers for the first coordinate plane and the second coordinate plane, the first set of coordinate fields for the first coordinate plane (e.g., the xy coordinate plane) and the second set of coordinate fields for the second coordinate plane (e.g., the yz coordinate plane), and/or the like), based at least in part on the output from the second model (e.g., the three-dimensional vector), and/or the like.

In some aspects, the estimator 406 determines the estimated transmit power using a third model, which may be a linear regression model or another type of model that may be used to determine a transmit power. The estimator 406 may determine a first transmit power component associated with the estimated position for the first coordinate plane (e.g., the xy coordinate plane) from the first model. The estimator 406 may determine a second transmit power component associated with the estimated position for the second coordinate plane (e.g., the yz coordinate plane) from the first model. The estimator 406 may use the third model to determine the estimated transmit power based at least in part on the first transmit power component and the second transmit power component. For example, the estimator 406 may use the linear regression model to minimize the least mean square error for the first transmit power component and the second transmit power component to determine the estimated transmit power as an output from the third model.

Figure 4F:
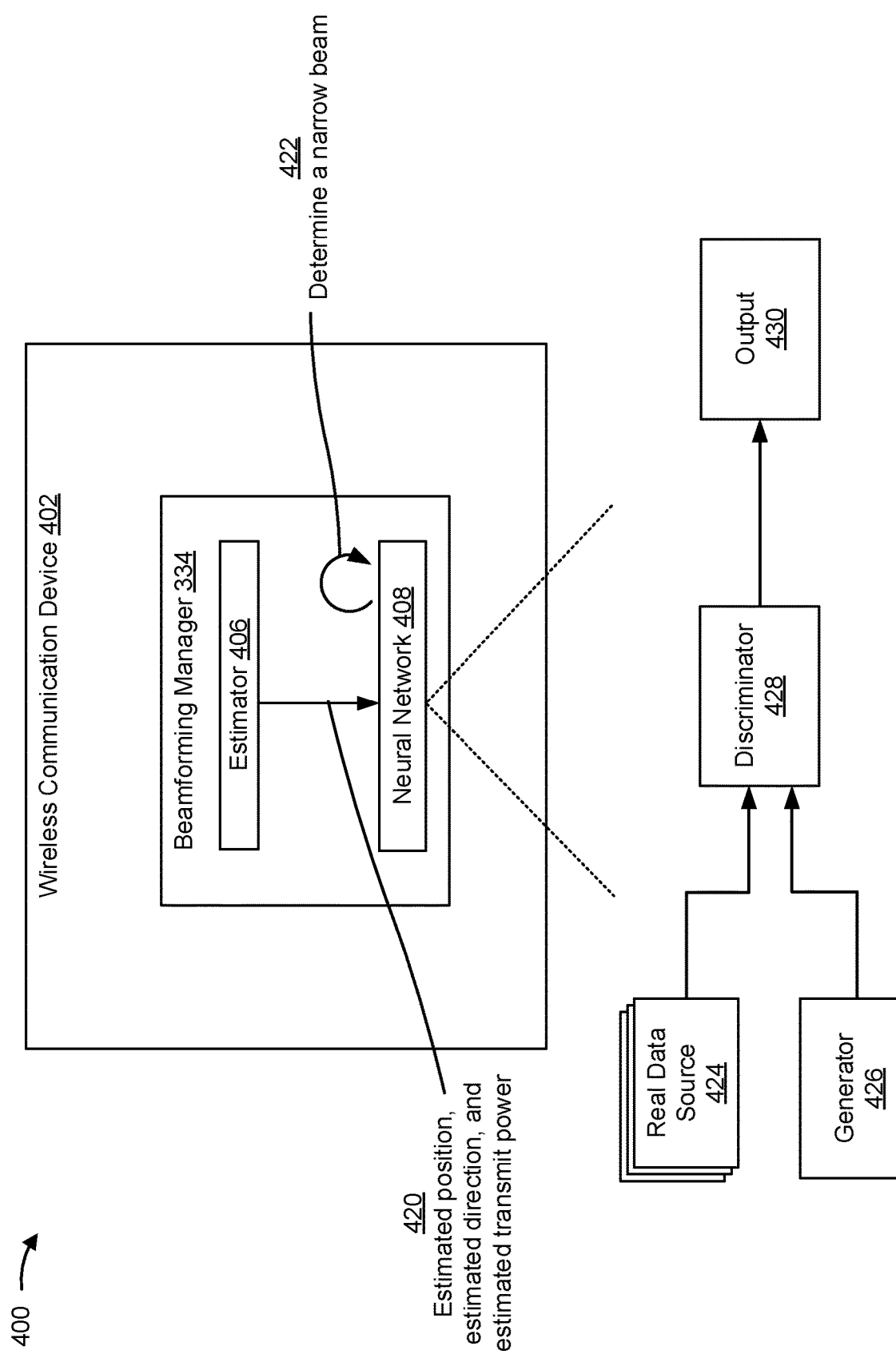

As shown in FIG. 4F, and by reference number 422, the estimator 406 may club (e.g., combine or merge into a single data structure) (e.g., using transmit processor 220, receive processor 238, controller/processor 240, memory 242, receive processor 258, transmit processor 264, controller/processor 280, memory 282, and/or the like) the outputs from the first model, the second model, and the third model to generate an input to the neural network 408, and may provide the input to the neural network 408. For example, the estimator 406 may club the estimated position from the first model, the estimated direction from the second model, and the estimated transmit power from the third model to form a data structure. The data structure may be referred to as Estimated_temp or by another designator.

As further shown in FIG. 4F, and by reference number 422, the neural network 408 may receive the input of the data structure and may process the data structure (e.g., using transmit processor 220, receive processor 238, controller/processor 240, memory 242, receive processor 258, transmit processor 264, controller/processor 280, memory 282, and/or the like) to determine a narrow beam for transmission of the packet 412 to the wireless communication device 404. The neural network 408 may be a generative adversarial network (GAN) or another type of neural network that is capable of determining an estimated path and the narrow beam for the transmission of the packet 412 to the wireless communication device 404. The neural network 408 may determine the narrow beam by determining a direction for the narrow beam, a three-dimensional shape for the narrow beam, and/or other parameters for the narrow beam.

As further shown in FIG. 4F, an example GAN may include a real data source 424, a generator 426, a discriminator 428, and an output 430. The real data source 424 may provide real data to the discriminator 428. The real data may include historical data from correctly determined narrow beams determined by the neural network 408. The generator 426 may generate sample data that is provided to the discriminator 428. The discriminator 428 may be trained on the real data and the sample data. In particular, the discriminator 428 may use the real data as positive examples during the training, and may use the sample data as negative examples during the training. During the training, the discriminator 428 attempts to classify the real data and the sample data into different categories using one or more loss functions. A discriminator loss may be determined for misclassified data, which may be used to update the weights of the loss functions used by the discriminator 428 through backpropagation.

The trained discriminator 428 may be used to further train the generator 426 to generate more accurate sample data. In this way, the trained generator 428 may be used to generate narrow beam determinations for the beamforming manager 334. Thus, the input of the data structure from the estimator 406 may be provided to the trained generator 426, which may generate a narrow beam based at least in part on the input of the data structure from the estimator 406.

The beamforming manager 334 may provide an indication of the narrow beam to a front-end transmission chain of the wireless communication device 402, which may include one or more components of FIG. 2 (e.g., a TX MIMO processor 230, a MOD 232, an antenna 234, a TX MIMO processor 266, a MOD 254, an antenna 252, and/or the like), one or more components of the beamforming architecture 300 of FIG. 3 (e.g., the modem 302, the DAC 304, the first mixer 306, the second mixer 308, the splitter 310, first amplifiers 312, phase shifters 314, second amplifiers 316, the antenna array 318, antenna elements 320, and/or the like), and/or the like.

Figure 4G:
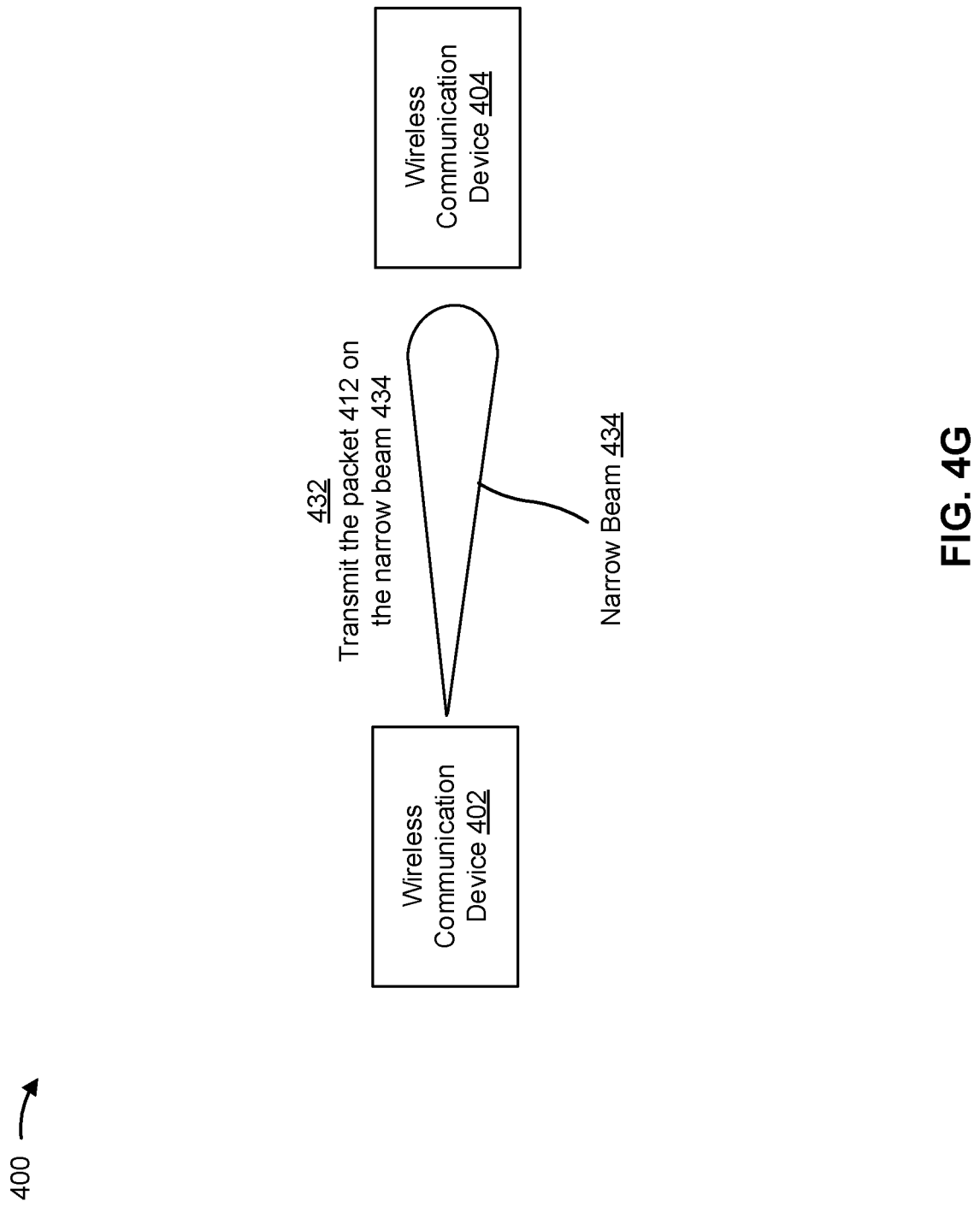

As shown in FIG. 4G, and by reference number 432, the wireless communication device 402 may wirelessly transmit the packet 412 on the narrow beam (e.g., narrow beam 434) to the wireless communication device 404. The wireless communication device 402 may transmit (e.g., using the TX MIMO processor 230, the MOD 232, the antenna 234, the TX MIMO processor 266, the MOD 254, the antenna 252, the modem 302, the DAC 304, the first mixer 306, the second mixer 308, the splitter 310, first amplifiers 312, phase shifters 314, second amplifiers 316, the antenna array 318, antenna elements 320, and/or the like) the packet 412 in a wireless communication, such as a downlink communication, an uplink communication, a sidelink communication, or another type of wireless communication.

In this way, the wireless communication device 402 may use various models of an estimator 406 and a neural network 408 to determine, generate, and/or configure the narrow beam 434 to enable efficient communication with the second wireless communication device. The models and the neural network 408 may account for movement of the wireless communication device 402 and the wireless communication device 404, orientation of the wireless communication device 402, transmit power of the wireless communication device 402, and/or the like. Accordingly, the use of the models and the neural network 408 enable the first wireless communication device to determine, generate, and/or configure the narrow beam 434 such that the narrow beam 434 reduces power consumption of the wireless communication device 402, increases the signal strength of communications transmitted on the narrow beam 434, increases reliability of the communications transmitted on the narrow beam 434, decreases latency for the communications transmitted on the narrow beam 434, and/or the like.

As indicated above, FIGS. 4A-4G is provided as one or more examples. Other examples may differ from what is described with respect to FIGS. 4A-4G.

Figure 5:
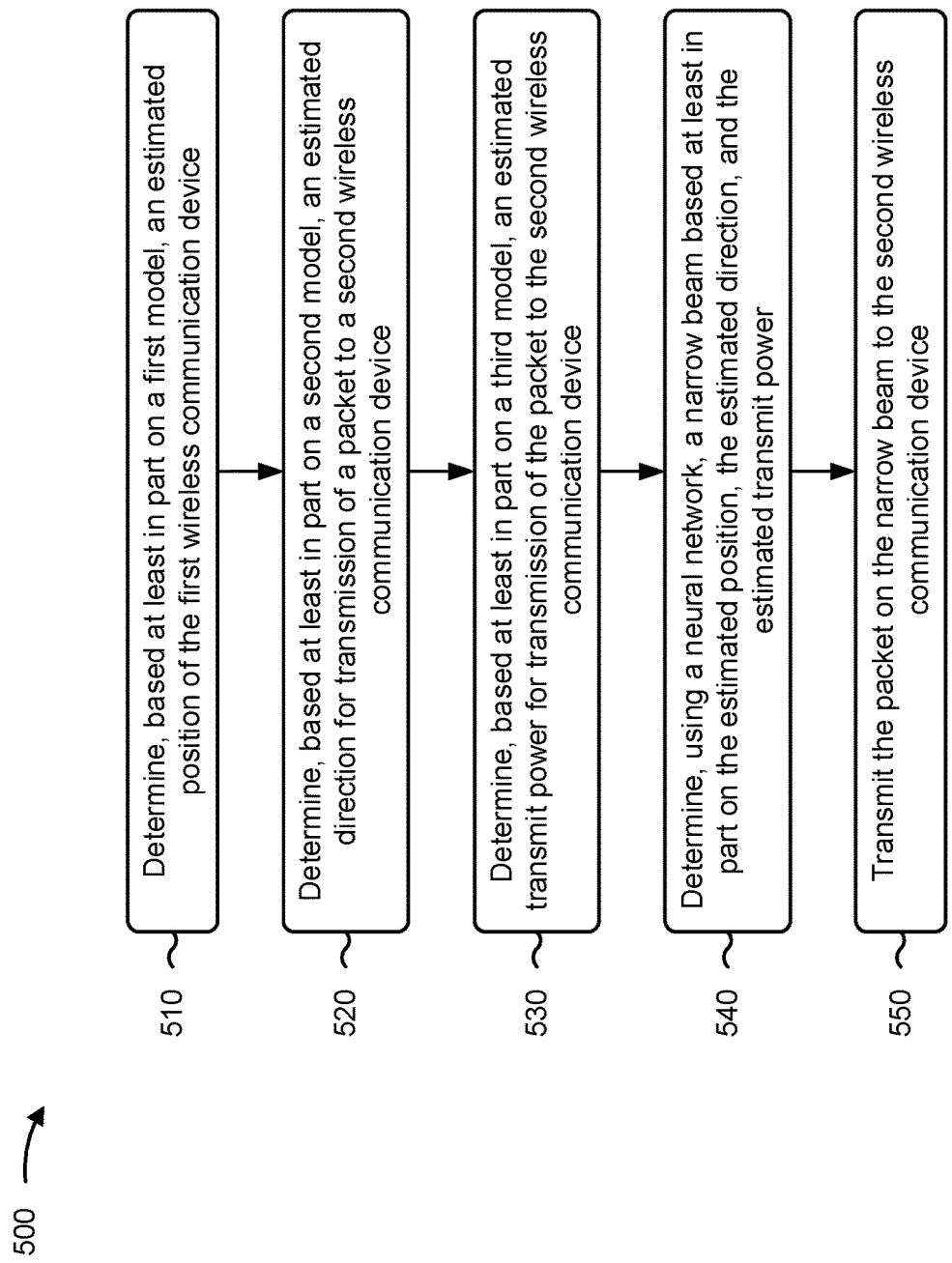
FIG. 5 is a diagram illustrating an example process associated with determining a narrow beam for wireless communication, in accordance with various aspects of the present disclosure.

FIG. 5 is a diagram illustrating an example process 500 performed, for example, by a first wireless communication device, in accordance with various aspects of the present disclosure. Example process 500 is an example where the first wireless communication device (e.g., UE 120, BS 110, wireless communication device 402, and/or the like) performs operations associated with determining a narrow beam for wireless communication.

As shown in FIG. 5, in some aspects, process 500 may include determining, based at least in part on a first model, an estimated position of the first wireless communication device (block 510). For example, the first wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, memory 282, beamforming manager 334, and/or estimator 406) may determine, based at least in part on a first model, an estimated position of the first wireless communication device, as described above.

As further shown in FIG. 5, in some aspects, process 500 may include determining, based at least in part on a second model, an estimated direction for transmission of a packet to a second wireless communication device (block 520). For example, the first wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, memory 282, beamforming manager 334, and/or estimator 406) may determine, based at least in part on a second model, an estimated direction for transmission of a packet to a second wireless communication device, as described above.

As further shown in FIG. 5, in some aspects, process 500 may include determining, based at least in part on a third model, an estimated transmit power for transmission of the packet to the second wireless communication device (block 530). For example, the first wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, memory 282, beamforming manager 334, and/or estimator 406) may determine, based at least in part on a third model, an estimated transmit power for transmission of the packet to the second wireless communication device, as described above.

As further shown in FIG. 5, in some aspects, process 500 may include determining, using a neural network, a narrow beam based at least in part on the estimated position, the estimated direction, and the estimated transmit power (block 540). For example, the first wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, memory 282, beamforming manager 334, and/or estimator 406) may determine, using a neural network, a narrow beam based at least in part on the estimated position, the estimated direction, and the estimated transmit power, as described above.

As further shown in FIG. 5, in some aspects, process 500 may include transmitting the packet on the narrow beam to the second wireless communication device (block 550). For example, the first wireless communication device (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, memory 282, modem 302, DAC 304, first mixer 306, second mixer 308, splitter 310, first amplifiers 312, phase shifters 314, second amplifiers 316, antenna array 318, antenna elements 320, and/or the like) may transmit the packet on the narrow beam to the second wireless communication device, as described above.

Process 500 may include additional aspects, such as any single aspect or any combination of aspects described below and/or in connection with one or more other processes described elsewhere herein.

In a first aspect, determining the estimated position comprises determining the estimated position based at least in part on one or more first parameters associated with the packet, and one or more second parameters associated with another packet received from the second wireless communication device. In a second aspect, the one or more first parameters comprise at least one of beam position coordinates associated with the first wireless communication device, and GNSS coordinates associated with the first wireless communication device, and the one or more second parameters comprise at least one of beam position coordinates associated with the second wireless communication device, and GNSS coordinates associated with the second wireless communication device.

In a third aspect, the first model comprises a regression model, and determining the estimated position comprises determining, using the regression model, a first set of coordinate fields for a first coordinate plane, and determining, using the regression model, a second set of coordinate fields for a second coordinate plane. In a fourth aspect, the first set of coordinate fields and the second set of coordinate fields are based at least in part on beam position coordinates associated with the first wireless communication device, GNSS coordinates associated with the first wireless communication device, beam position coordinates associated with the second wireless communication device, and GNSS coordinates associated with the second wireless communication device.

In a fifth aspect, determining the first set of coordinate fields comprises determining a first beam coordinate field of the first set of coordinate fields based at least in part on a difference between a first beam position coordinate of the beam position coordinates associated with the first wireless communication device and an accumulated change for the first beam position coordinate, determining a second beam coordinate field of the first set of coordinate fields based at least in part on a difference between a second beam position coordinate of the beam position coordinates associated with the first wireless communication device and an accumulated change for the second beam position coordinate, determining a first GNSS coordinate field of the first set of coordinate fields based at least in part on a difference between a first GNSS coordinate of the GNSS coordinates associated with the first wireless communication device and an accumulated change for the first GNSS coordinate, and determining a second GNSS coordinate field of the first set of coordinate fields based at least in part on a difference between a second GNSS coordinate of the GNSS coordinates associated with the first wireless communication device and an accumulated change for the second GNSS coordinate.

In a sixth aspect, process 500 includes determining an estimated error for each coordinate field of the first set of coordinate fields, and determining a confidence value for each estimated error. In a seventh aspect, determining the confidence value for each estimated error comprises determining, for a first coordinate field of the first set of coordinate fields, that a first confidence value is 0 if an estimated error for the first coordinate field satisfies a first threshold, or that the first confidence value is 1 if the estimated error for the first coordinate field does not satisfy the first threshold, and determining, for a second coordinate field of the first set of coordinate fields, that a second confidence value is 0 if an estimated error for the second coordinate field satisfies a second threshold, or that the second confidence value is 1 if the estimated error for the second coordinate field does not satisfy the second threshold.

In an eighth aspect, determining the estimated position comprises determining, as the estimated position, a first beam number based at least in part on the first set of coordinate fields, and a second beam number based at least in part on the second set of coordinate fields. In a ninth aspect, determining the estimated direction for transmission of the packet to the second wireless communication device comprises determining the estimated direction as a three-dimensional vector that is based at least in part on a first set of coordinate fields in a first plane associated with the estimated position of the first wireless communication device, and a second set of coordinate fields in a second plane associated with the estimated position of the first wireless communication device.

In a tenth aspect, the third model comprises a linear regression model, and determining the estimated transmit power for transmission of the packet to the second wireless communication device comprises determining a first transmit power component in a first plane associated with the estimated position of the first wireless communication device, determining a second transmit power component in a second plane associated with the estimated position of the first wireless communication device, and determining, using the linear regression model, the estimated transmit power based at least in part on the first transmit power component and the second transmit power component. In an eleventh aspect, the neural network is a generative adversarial network, and determining the narrow beam comprises clubbing the estimated position, the estimated direction, and the estimated transmit power to generate an input to the generative adversarial network, and processing the input using the generative adversarial network to determine narrow beam.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first wireless communication device, comprising:
   determining, based at least in part on a first model, an estimated position of the first wireless communication device, the estimated position including a first set of coordinate fields for a first coordinate plane and a second set of coordinate fields for a second coordinate plane;
   determining, for a first coordinate field of the first set of coordinate fields:
      that a first confidence value for an estimated error for the first coordinate field is 0 if the estimated error for the first coordinate field satisfies a first threshold, or
      that the first confidence value is 1 if the estimated error for the first coordinate field does not satisfy the first threshold;
   determining, for a second coordinate field of the first set of coordinate fields:
      that a second confidence value for an estimated error for the second coordinate field is 0 if the estimated error for the second coordinate field satisfies a second threshold, or
      that the second confidence value is 1 if the estimated error for the second coordinate field does not satisfy the second threshold;
   determining, based at least in part on a second model, an estimated direction for transmission of a packet to a second wireless communication device;
   determining, based at least in part on a third model, an estimated transmit power for transmission of the packet to the second wireless communication device;
   determining, using a neural network, a narrow beam based at least in part on the estimated position, the estimated direction, and the estimated transmit power; and
   transmitting the packet on the narrow beam to the second wireless communication device.

2. The method of claim 1, wherein determining the estimated position comprises:
   determining the estimated position based at least in part on:
      one or more first parameters associated with the packet, and
      one or more second parameters associated with another packet received from the second wireless communication device.

3. The method of claim 2, wherein the one or more first parameters comprise at least one of:
   beam position coordinates associated with the first wireless communication device, and
   global navigation satellite system (GNSS) coordinates associated with the first wireless communication device; and
   wherein the one or more second parameters comprise at least one of:
      beam position coordinates associated with the second wireless communication device, and
      GNSS coordinates associated with the second wireless communication device.

4. The method of claim 1, wherein the first model comprises a regression model; and
   wherein determining the estimated position comprises:
      determining, using the regression model, the first set of coordinate fields for the first coordinate plane; and
      determining, using the regression model, the second set of coordinate fields for the second coordinate plane.

5. The method of claim 4, wherein the first set of coordinate fields and the second set of coordinate fields are based at least in part on:
   beam position coordinates associated with the first wireless communication device,
   global navigation satellite system (GNSS) coordinates associated with the first wireless communication device;
   beam position coordinates associated with the second wireless communication device; and
   GNSS coordinates associated with the second wireless communication device.

6. The method of claim 5, wherein determining the first set of coordinate fields comprises:
   determining a first beam coordinate field of the first set of coordinate fields based at least in part on a difference between a first beam position coordinate of the beam position coordinates associated with the first wireless communication device and an accumulated change for the first beam position coordinate;

determining a second beam coordinate field of the first set of coordinate fields based at least in part on a difference between a second beam position coordinate of the beam position coordinates associated with the first wireless communication device and an accumulated change for the second beam position coordinate;

determining a first GNSS coordinate field of the first set of coordinate fields based at least in part on a difference between a first GNSS coordinate of the GNSS coordinates associated with the first wireless communication device and an accumulated change for the first GNSS coordinate; and determining a second GNSS coordinate field of the first set of coordinate fields based at least in part on a difference between a second GNSS coordinate of the GNSS coordinates associated with the first wireless communication device and an accumulated change for the second GNSS coordinate.

7. The method of claim 4, further comprising:
determining an estimated error for each coordinate field of the first set of coordinate fields, and
determining a confidence value for each estimated error.

8. The method of claim 4, wherein determining the estimated position comprises:
determining, as the estimated position:
a first beam number based at least in part on the first set of coordinate fields; and
a second beam number based at least in part on the second set of coordinate fields.

9. The method of claim 1, wherein determining the estimated direction for transmission of the packet to the second wireless communication device comprises:
determining the estimated direction as a three-dimensional vector that is based at least in part on:
the first set of coordinate fields in the first coordinate plane, and
the second set of coordinate fields in the second coordinate plane.

10. The method of claim 1, wherein the third model comprises a linear regression model; and
wherein determining the estimated transmit power for transmission of the packet to the second wireless communication device comprises:
determining a first transmit power component in the first coordinate plane;
determining a second transmit power component in the second coordinate plane; and
determining, using the linear regression model, the estimated transmit power based at least in part on the first transmit power component and the second transmit power component.

11. The method of claim 1, wherein the neural network is a generative adversarial network; and
wherein determining the narrow beam comprises:
clubbing the estimated position, the estimated direction, and the estimated transmit power to generate an input to the generative adversarial network; and
processing the input using the generative adversarial network to determine narrow beam.

12. A first wireless communication device for wireless communication, comprising:
a memory; and
one or more processors coupled to the memory, the one or more processors configured to:
determine, based at least in part on a first model, an estimated position of the first wireless communication device, the estimated position including a first set of coordinate fields for a first coordinate plane and a second set of coordinate fields for a second coordinate plane;
determine, for a first coordinate field of the first set of coordinate fields:
that a first confidence value for an estimated error for the first coordinate field is 0 if the estimated error for the first coordinate field satisfies a first threshold, or
that the first confidence value is 1 if the estimated error for the first coordinate field does not satisfy the first threshold;
determine, for a second coordinate field of the first set of coordinate fields:
that a second confidence value for an estimated error for the second coordinate field is 0 if the estimated error for the second coordinate field satisfies a second threshold, or
that the second confidence value is 1 if the estimated error for the second coordinate field does not satisfy the second threshold;
determine, based at least in part on a second model, an estimated direction for transmission of a packet to a second wireless communication device;
determine, based at least in part on a third model, an estimated transmit power for transmission of the packet to the second wireless communication device;
determine, using a neural network, a narrow beam based at least in part on the estimated position, the estimated direction, and the estimated transmit power; and
transmit the packet on the narrow beam to the second wireless communication device.

13. The first wireless communication device of claim 12, wherein the one or more processors, when determining the estimated position, are configured to:
determine the estimated position based at least in part on:
one or more first parameters associated with the packet, and
one or more second parameters associated with another packet received from the second wireless communication device.

14. The first wireless communication device of claim 13, wherein the one or more first parameters comprise at least one of:
beam position coordinates associated with the first wireless communication device, and
global navigation satellite system (GNSS) coordinates associated with the first wireless communication device; and
wherein the one or more second parameters comprise at least one of:
beam position coordinates associated with the second wireless communication device, and
GNSS coordinates associated with the second wireless communication device.

15. The first wireless communication device of claim 12, wherein the first model comprises a regression model; and
wherein the one or more processors, when determining the estimated position, are configured to:
determine, using the regression model, the first set of coordinate fields for the first coordinate plane; and
determine, using the regression model, the second set of coordinate fields for the second coordinate plane.

16. The first wireless communication device of claim 15, wherein the first set of coordinate fields and the second set of coordinate fields are based at least in part on:
   beam position coordinates associated with the first wireless communication device,
   global navigation satellite system (GNSS) coordinates associated with the first wireless communication device;
   beam position coordinates associated with the second wireless communication device; and
   GNSS coordinates associated with the second wireless communication device.

17. The first wireless communication device of claim 16, wherein the one or more processors, when determining the first set of coordinate fields, are configured to:
   determine a first beam coordinate field of the first set of coordinate fields based at least in part on a difference between a first beam position coordinate of the beam position coordinates associated with the first wireless communication device and an accumulated change for the first beam position coordinate;
   determine a second beam coordinate field of the first set of coordinate fields based at least in part on a difference between a second beam position coordinate of the beam position coordinates associated with the first wireless communication device and an accumulated change for the second beam position coordinate;
   determine a first GNSS coordinate field of the first set of coordinate fields based at least in part on a difference between a first GNSS coordinate of the GNSS coordinates associated with the first wireless communication device and an accumulated change for the first GNSS coordinate; and
   determine a second GNSS coordinate field of the first set of coordinate fields based at least in part on a difference between a second GNSS coordinate of the GNSS coordinates associated with the first wireless communication device and an accumulated change for the second GNSS coordinate.

18. The first wireless communication device of claim 15, wherein the one or more processors are further configured to:
   determine an estimated error for each coordinate field of the first set of coordinate fields, and
   determine a confidence value for each estimated error.

19. The first wireless communication device of claim 15, wherein the one or more processors, when determining the estimated position, are configured to:
   determine, as the estimated position:
      a first beam number based at least in part on the first set of coordinate fields; and
      a second beam number based at least in part on the second set of coordinate fields.

20. The first wireless communication device of claim 12, wherein the one or more processors, when determining the estimated direction for transmission of the packet to the second wireless communication device, are configured to:
   determine the estimated direction as a three-dimensional vector that is based at least in part on:
      the first set of coordinate fields in the first coordinate plane, and
      the second set of coordinate fields in the second coordinate plane.

21. The first wireless communication device of claim 12, wherein the third model comprises a linear regression model; and
wherein the one or more processors, when determining the estimated transmit power for transmission of the packet to the second wireless communication device, are configured to:
   determine a first transmit power component in the first coordinate plane;
   determine a second transmit power component in the second coordinate plane; and
   determine, using the linear regression model, the estimated transmit power based at least in part on the first transmit power component and the second transmit power component.

22. The first wireless communication device of claim 12, wherein the neural network is a generative adversarial network; and
wherein the one or more processors, when determining the narrow beam, are configured to:
   club the estimated position, the estimated direction, and the estimated transmit power to generate an input to the generative adversarial network; and
   process the input using the generative adversarial network to determine narrow beam.

23. A non-transitory computer-readable medium storing a set of instructions for wireless communication, the set of instructions comprising:
   one or more instructions that, when executed by one or more processors of a first wireless communication device, cause the first wireless communication device to:
      determine, based at least in part on a first model, an estimated position of the first wireless communication device, the estimated position including a first set of coordinate fields for a first coordinate plane and a second set of coordinate fields for a second coordinate plane;
      determine, for a first coordinate field of the first set of coordinate fields:
         that a first confidence value for an estimated error for the first coordinate field is 0 if the estimated error for the first coordinate field satisfies a first threshold, or
         that the first confidence value is 1 if the estimated error for the first coordinate field does not satisfy the first threshold;
      determine, for a second coordinate field of the first set of coordinate fields:
         that a second confidence value for an estimated error for the second coordinate field is 0 if the estimated error for the second coordinate field satisfies a second threshold, or
         that the second confidence value is 1 if the estimated error for the second coordinate field does not satisfy the second threshold;
      determine, based at least in part on a second model, an estimated direction for transmission of a packet to a second wireless communication device;
      determine, based at least in part on a third model, an estimated transmit power for transmission of the packet to the second wireless communication device;
      determine, using a neural network, a narrow beam based at least in part on the estimated position, the estimated direction, and the estimated transmit power; and
      transmit the packet on the narrow beam to the second wireless communication device.

24. The non-transitory computer-readable medium of claim 23, wherein the one or more instructions, that cause the first wireless communication device to determine the estimated position, cause the first wireless communication device to:
- determine the estimated position based at least in part on:
  - one or more first parameters associated with the packet, and
  - one or more second parameters associated with another packet received from the second wireless communication device.

25. The non-transitory computer-readable medium of claim 23, wherein the first model comprises a regression model; and
wherein the one or more instructions, that cause the first wireless communication device to determine the estimated position, cause the first wireless communication device to:
- determine, using the regression model, the first set of coordinate fields for the first coordinate plane; and
- determine, using the regression model, the second set of coordinate fields for the second coordinate plane.

26. The non-transitory computer-readable medium of claim 23, wherein the first set of coordinate fields and the second set of coordinate fields are based at least in part on:
- beam position coordinates associated with the first wireless communication device,
- global navigation satellite system (GNSS) coordinates associated with the first wireless communication device;
- beam position coordinates associated with the second wireless communication device; and
- GNSS coordinates associated with the second wireless communication device.

27. The non-transitory computer-readable medium of claim 26, wherein the one or more instructions further cause the first wireless communication device to:
- determine a first beam coordinate field of the first set of coordinate fields based at least in part on a difference between a first beam position coordinate of the beam position coordinates associated with the first wireless communication device and an accumulated change for the first beam position coordinate;
- determine a second beam coordinate field of the first set of coordinate fields based at least in part on a difference between a second beam position coordinate of the beam position coordinates associated with the first wireless communication device and an accumulated change for the second beam position coordinate;
- determine a first GNSS coordinate field of the first set of coordinate fields based at least in part on a difference between a first GNSS coordinate of the GNSS coordinates associated with the first wireless communication device and an accumulated change for the first GNSS coordinate; and
- determine a second GNSS coordinate field of the first set of coordinate fields based at least in part on a difference between a second GNSS coordinate of the GNSS coordinates associated with the first wireless communication device and an accumulated change for the second GNSS coordinate.

28. A first apparatus for wireless communication, comprising:
- means for determining, based at least in part on a first model, an estimated position of the first apparatus, the estimated position including a first set of coordinate fields for a first coordinate plane and a second set of coordinate fields for a second coordinate plane;
- means for determining, for a first coordinate field of the first set of coordinate fields:
  - that a first confidence value for an estimated error for the first coordinate field is 0 if the estimated error for the first coordinate field satisfies a first threshold, or
  - that the first confidence value is 1 if the estimated error for the first coordinate field does not satisfy the first threshold;
- means for determining, for a second coordinate field of the first set of coordinate fields:
  - that a second confidence value for an estimated error for the second coordinate field is 0 if the estimated error for the second coordinate field satisfies a second threshold, or
  - that the second confidence value is 1 if the estimated error for the second coordinate field does not satisfy the second threshold;
- means for determining, based at least in part on a second model, an estimated direction for transmission of a packet to a second apparatus;
- means for determining, based at least in part on a third model, an estimated transmit power for transmission of the packet to the second apparatus;
- means for determining, using a neural network, a narrow beam based at least in part on the estimated position, the estimated direction, and the estimated transmit power; and
- means for transmitting the packet on the narrow beam to the second apparatus.

29. The first apparatus of claim 28, wherein the means for determining the estimated direction for transmission of the packet to the second apparatus comprises:
- means for determining the estimated direction as a three-dimensional vector that is based at least in part on:
  - the first set of coordinate fields for the first coordinate plane, and
  - the second set of coordinate fields for the second coordinate plane.

30. The first apparatus of claim 28, wherein the third model comprises a linear regression model; and
wherein the means for determining the estimated transmit power for transmission of the packet to the second apparatus comprises:
- means for determining a first transmit power component in the first coordinate plane;
- means for determining a second transmit power component in the second coordinate plane; and
- means for determining, using the linear regression model, the estimated transmit power based at least in part on the first transmit power component and the second transmit power component.

* * * * *